United States Patent Office 2,767,214
Patented Oct. 16, 1956

2,767,214

POLYALKYLENE POLYAMINES

Frederick C. Bersworth, Framingham Center, Mass., assignor to The Dow Chemical Company, Midland, Mich., a corporation of Delaware No Drawing. Application June 3, 1952,
Serial No. 291,577

6 Claims. (Cl. 260—584)

This invention relates to chemical compounds and more particularly to organic chemical compounds and has for its object the provision of a new type of polyalkylene polyamines having nitrogen atoms in the end amino group thereof which are capable of reacting chemically independently of the other and interior nitrogen atoms in the molecule.

Another object is to provide poly hydroxy polyalkylene polyamines conforming to the general structural formula:

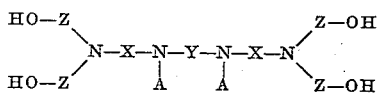

wherein Y is a bivalent alkylene chain containing from 2 to 3 carbon atoms; X is a bivalent alkylene radical of from 4 to 12 carbon atoms which may be interrupted with ether oxygen atoms; Z is a bivalent alkylene radical of from 2 to 6 carbon atoms which may be either branched or straight chained; and A is a member of the group consisting of hydrogen and one of the substituent groups consisting of methyl, ethyl, n-propyl, isopropyl and butyl.

Still another object is to provide polyhydroxy polyalkylene polyamines having end amino groups therein containing an amino nitrogen which is capable of independent chemical reaction as a tertiary nitrogen, thereby adapting the polyamine for wide utility as an intermediate in the formation of a large number of amino compounds of great utility in the art.

Other objects will be apparent as the invention is more fully hereinafter disclosed.

In accordance with these objects I have discovered that the polyhydroxy polyalkylene polyamines conforming to the above formula are of great utility in organic synthesis reactions due to the fact that the X groups present therein space the end amino groups away from the interior nitrogens sufficiently to permit these end nitrogens to react chemically as a tertiary nitrogen independently of the interior spaced nitrogens, thus permitting the compound to act chemically in the formation of a large number of chemical compounds, based on this reaction and on the substitution of one or both of the remaining hydrogens on the interior amino nitrogens.

For the purpose of this invention certain limitations are put upon the various alternatives for X, Y, Z and A in the compound. Bearing in mind that the preferred compounds are designed to contain end amino groups containing nitrogen atoms reactive as tertiary nitrogens independently of the interior nitrogen atoms, thereby adapting the compound to function as intermediates in further syntheses, these limitations are of the essence of the invention.

In order to permit the nitrogen atoms of the end amino groups of the polyamines to react chemically as tertiary nitrogens in the production of quarternary type compounds, I have discovered that the X groups in the compound must contain at least four carbon atoms and up to 12 carbon atoms. Adequate solubility of the compounds in water is a desirable but not a necessary requisite for these compounds, and other factors being equal, I have discovered that with increase in the size and weight of the various radicals X, Y, Z and A, the water solubility of the polyalkylol polyalkylene polyamine compounds decreases and their solubility in organic solvents increases. If X represents an alkylene group which contains an ether oxygen linkage, a greater size and weight of the X radicals can be tolerated in the water soluble compounds before solubility decreases because of the enhanced solubilizing effect of the oxygen atom.

The compounds of this invention are produced by initially reacting two molecular proportions of the appropriate halogen substituted alkyl or alkoxyalkyl dialkanolamine, for example, 2-chloroethoxy-ethyldiethanolamine, with one molecular proportion of the appropriate alkylene diamine, such as, ethylene diamine, under conditions such as to insure a substantial yield of the polyalkylol polyalkylene polyamine derivative.

Another method which may be employed to produce the compounds of this invention consists in reacting the proper symmetrical chloroalkyl or chloroalkoxyalkyl ethylene diamine, such as N,N'-di-(4-chlorobutyl)-ethylene diamine, under suitable conditions with the appropriate dialkanolamine, for example, diethanolamine, in a one to two molar ratio.

Although these compounds can be prepared by methods other than those described above and also by modifications which will appear to those skilled in the art, I prefer to use the procedure followed in the specific examples hereinafter given since it is easily carried out, requires the use of simple and uncomplicated apparatus and involves a minimum of manipulation.

It has been found that in general the longer the bivalent alkylene group in the X positions, the more independent the alkylol substituted nitrogen atoms in the end amino groups become in their chemical reactions. The so constructed polyfunctional nitrogen compounds permit the production of thus far unobtainable quaternary type compounds and compositions of matter, such as soap-like amino products which are highly useful in industry.

This invention will be further illustrated by the following examples. It should be understood that although these examples may describe some specific manipulative steps in detail which may be employed in the preparation of these compounds, they are given primarily by way of illustration and not by way of limitation and the invention in its broader aspects is not to be restricted to these examples.

*Example I*

Two mols of 4-bromobutyl diethanolamine were added over a four hour period to a slowly refluxing solution of one mol of anhydrous isopropylene diamine in 500 ml. of alcohol containing two mols of sodium hydroxide as acid acceptor. The mixture was heated to reflux for an additional 4 hours. The sodium bromide present in the reaction solution was removed by filtration and the alcohol content of the reaction solution was removed by distillation at atmospheric pressure. The product obtained was a viscid yellow liquid soluble in water, alcohols and somewhat soluble in acetone. Chemical analysis of this compound confirmed that the compound may be represented by the following formula:

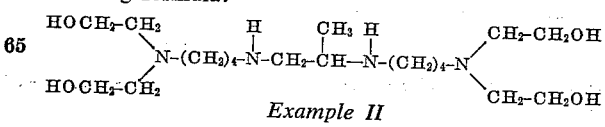

*Example II*

To a gently refluxing solution of one mol of N,N'-diethyl ethylene diamine in 500 ml. of isopropyl alcohol containing two mols of sodium hydroxide there was gradually added over a period of four hours, two mols of omega chloro dodecyl diethanolamine. The mixture was then held at gentle reflux for an additional six hours. The sodium chloride content of the reaction solution was removed by filtration and the isopropyl alcohol content of the reaction solution was distilled off. The resulting product, N,N'-di-(omega-iminodiethanol-dodecyl)-N,N'-diethyl ethylene diamine is a viscous yellow liquid soluble in water and alcohols and chemical analysis confirmed the fact that the compound has the formula:

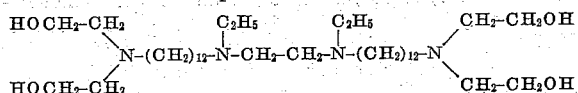

Example III

To a gently refluxing solution of two mols of dibutanolamine in 500 ml. of isopropyl alcohol containing two mols of sodium hydroxide, there was slowly added one mole of N,N'-di-(2-chloroethoxyethyl)-ethylene diamine over a four hour period. The mixture was gently refluxed for an additional four hours after which the sodium chloride content of the reaction solution was filtered off and the isopropyl alcohol content thereof was removed by distillation.

The product, N,N'-di-(2-iminodibutanol-ethoxyethyl)-ethylene diamine is a viscid yellow liquid soluble in water and alcohols and was found to have the formula:

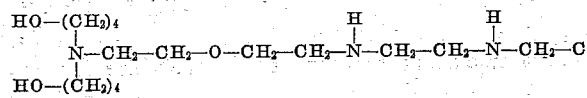

Example IV 0.5 mol of N-(4-chlorobutyl)-dipropanolamine was gradually added over a period of two hours to a slowly refluxing solution of 0.25 mol of N,N'-diethyl trimethylene diamine in 500 ml. of isopropyl alcohol containing 0.5 mol of sodium hydroxide. The mixture was held at gentle reflux for an additional six hours after which time it was cooled, the sodium chloride content of the solution was removed by filtration and the isopropyl alcohol content was distilled off. The pale yellow viscous residue of N,N'-di-(4-iminodipropanol-butyl)-N,N'-diethyl-trimethylene diamine is soluble in water and alcohols and was found to have the formula:

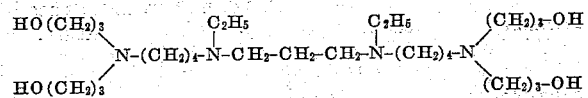

Example V

To a gently refluxing solution of 0.2 mol of dimethyl ethylene diamine in 300 ml. of isopropyl alcohol containing 0.4 mol of sodium hydroxide there was added dropwise over a three-hour period, 0.4 mol of N-(2-chloroethoxyethyl)-diethanolamine. The mixture was gently refluxed for an additional four hours after which the sodium chloride content of the reaction solution was removed by filtration and the isopropyl alcohol content thereof was removed by distillation. The viscous yellow reaction product, N,N'-di-(2-iminodiethanol-ethoxyethyl)-N,N'-dimethyl-ethylene diamine, is soluble in water and alcohols and was found to have the formula:

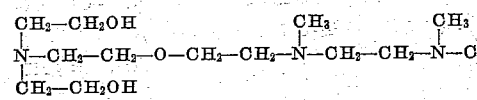

From the above specific examples of compounds falling within the broad scope of the present invention, it is believed apparent that as starting materials the following compounds may be employed: alkylene diamines, halogen substituted alkyl and alkoxy-alkyl dialkanolamines, symmetrical chloro alkyl and chloroalkoxyalkyl alkylene diamines and dialkanolamines.

Alkylene diamines suitable for making the new compounds in accordance with the above specific examples, include the following: ethylene diamine, isopropylene diamine, trimethylene diamine, N,N'-dimethyl-ethylene diamine, N,N'-diethyl isopropylene diamine, N,N'-diethyl trimethylene diamine, N,N'-di-(n-propyl)-ethylene diamine, N,N'-dibutyl trimethylene diamine and N,N'-dibutyl ethylene diamine.

The following halogen substituted alkyl and alkoxyalkyl dialkanolamines also may be employed as starting materials to react with the above alkylene diamines to make the new compounds of this invention: N-(2-chloroethoxyethyl)-diethanolamine, N-(4-chlorobutyl)-diethanolamine, N-(6-chlorohexyl)-diethanolamine, N-(8-chlorooctyl)-diethanolamine, N-(8-chlorooctyl)-dipropanolamine, N-(4-chlorobutyl)-dipropanolamine, N-(12-chlorododecyl)-diethanolamine, N-(6-chlorohexyl)-dibutanolamine and N-(4-chlorobutyl)-diisopropanolamine.

Suitable symmetrical chloroalkyl or chloroalkoxyalkyl alkylene diamines in the production of the compounds of the present invention consist of: N,N'-di-(4-chlorobutyl)-ethylene diamine, N,N'-di-(2-chloroethoxyethyl)-ethylene diamine, N,N'-di-(6-chloro-hexyl)-ethylene diamine, N,N'-di-(12-chlorododecyl)-ethylene diamine, N,N'-di-(2-chloroethoxyethyl)-trimethylene diamine, N,N'-di-(4-chlorobutyl)-trimethylene diamine, N,N'-di-(4-chlorobutyl)-isopropylene diamine, N,N'-di-(2-chloroethoxyethyl)-isopropylene diamine, N,N'-di-(4-chlorobutyl)-N,N'-dimethyl ethylene diamine, N,N'-di-(2-chloroethoxyethyl)-N,N'-diethyl ethylene diamine, N,N'-di-(4-chlorobutyl)-N,N'-dimethyl isopropylene diamine, N,N'-di-(2-chloroethoxyethyl)-N,N'-dibutyl ethylene diamine, and N,N'-di-(8-chlorooctyl)-N,N'-diethyl trimethylene diamine. The corresponding bromo compounds also may be employed.

The dialkanolamine radicals present in the compounds of this invention may be selected from a relatively large class, for example, diethanolamine, diisopropanolamine, di-n-propanolamine, di-n-butanolamine, di-iso-butanolamine, dipentanolamine and dihexanolamine.

In addition to the compounds described above, 1,2-diamino-cyclohexane or its N,N'-di-chloroalkyl derivatives may be used. A preferred compound of this series is produced from 1,2-diaminocyclohexane and N-(2-chloroethoxyethyl)-diethanolamine and is represented by the following formula:

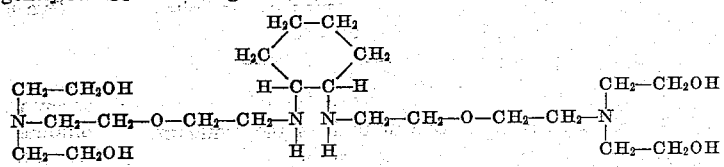

The above starting materials are mentioned only for purposes of illustration and not for limitation of the invention. Obviously other members of the classes indicated by the definitions previously given for the radicals X, Y, Z and A can be employed in the production of the polyhydroxy polyalkylene polyamines of the present invention.

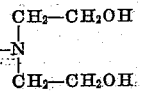

The compounds of this invention possess interesting and useful properties as surface active agents, detergents, wetting agents, and as intermediates in the production of thus far unobtainable compounds and have, therefore, diverse applications. They may, for example, serve as intermediates in the production of soap-like amino compounds having the generic formula:

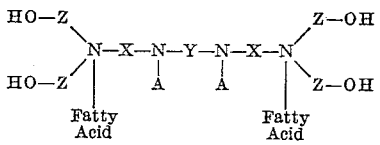

which in some respects are similar to the alkanolamine soaps. These soap-like amino products are readily formed by adding a fatty acid to an aqueous solution of the polyalkylol polyalkylene polyamine in the approximate molar ratios above indicated and heating the mixture to complete the formation of the soap-like amino product. These soap-like amino products are soluble in water and to some extent are also soluble in solvents.

The compounds of the present invention also are especially useful as intermediates for the production of surface-active agents and as additives to lubricants and greases.

The soap-like amino compounds above described offer wide utility in the art as assistants in textile and leather manufacture, in glass and metal cleaners, dry cleaners, lubricants, soap compositions and in numerous miscellaneous applications where detergency and wetting action are desired in combination.

Having hereinabove disclosed the present invention generically and specifically and having given a plurality of specific examples thereof, it is believed apparent that the compounds of the invention may be widely varied without essential departure therefrom and all such modifications and adaptations thereof are contemplated as may fall within the scope of the following claims.

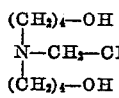

What I claim is:
1. Chemical compounds corresponding to the general formula

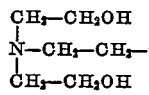

wherein Y is an alkylene radical containing 2-3 carbon atoms; X is selected from the group consisting of alkylene radicals having 4-12 carbon atoms in the chain such that the indicated nitrogen atoms are separated by at least 4 carbon atoms, and the ethoxy ethyl radical; Z is an alkylene radical having 2-6 carbon atoms; and A is selected from the group consisting of hydrogen, methyl, ethyl, n-propyl, isopropyl and butyl radicals.

2. The compound N,N'-di-(4-iminodiethanol-butyl)-isopropylene diamine conforming to the following formula:

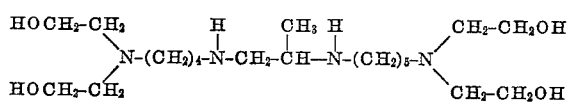

3. The compound N,N'-di-(omega-iminodiethanol-dodecyl) - N,N' - diethyl - ethylene diamine having the formula:

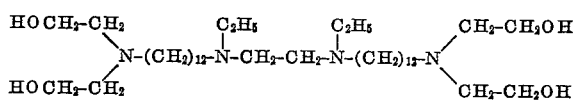

4. The compound N,N'-di-(2-iminodibutanol-ethoxyethyl)-ethylene diamine conforming to the following formula:

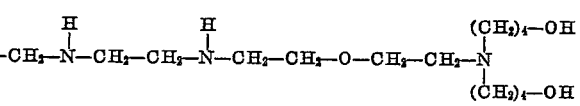

5. The compound N,N'-di-(imino dipropanol-butyl) N,N'-diethyl-trimethylene diamine conforming to the following formula:

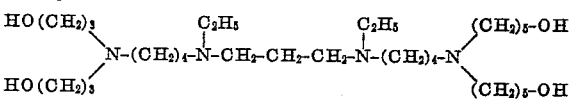

6. The compound N,N'-di-(2-imino-diethanol-ethoxyethyl)-N,N' dimethyl-ethylene diamine conforming to the following formula:

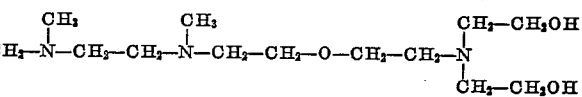

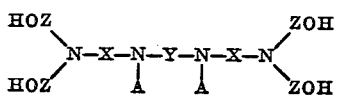

References Cited in the file of this patent
UNITED STATES PATENTS

| | | |
|---|---|---|
| 2,243,329 | De Groote et al. | May 27, 1941 |
| 2,248,729 | Ulrich et al. | July 8, 1941 |

FOREIGN PATENTS

| | | |
|---|---|---|
| 364,104 | Great Britain | Dec. 28, 1931 |